(12) United States Patent
Tirkkonen et al.

(10) Patent No.: US 8,798,032 B2
(45) Date of Patent: Aug. 5, 2014

(54) VIRTUAL TIMING INDICATION

(75) Inventors: Olav Tirkkonen, Helsinki (FI); Martin Doettling, Neubiberg (DE); Jiang Yu, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 376 days.

(21) Appl. No.: 13/266,953

(22) PCT Filed: Apr. 29, 2010

(86) PCT No.: PCT/EP2010/055846
§ 371 (c)(1),
(2), (4) Date: Nov. 28, 2011

(87) PCT Pub. No.: WO2010/125155
PCT Pub. Date: Nov. 4, 2010

(65) Prior Publication Data
US 2012/0069836 A1 Mar. 22, 2012

Related U.S. Application Data

(60) Provisional application No. 61/214,991, filed on Apr. 29, 2009.

(51) Int. Cl.
*H04J 4/00* (2006.01)
*H04J 3/06* (2006.01)
*H04W 56/00* (2009.01)

(52) U.S. Cl.
CPC ......... *H04J 3/0638* (2013.01); *H04W 56/0015* (2013.01)
USPC ........................................ 370/350

(58) Field of Classification Search
CPC .. H04J 3/0638; H04W 56/00; H04W 56/0045
See application file for complete search history.

(56) References Cited

U.S. PATENT DOCUMENTS

| 2005/0185628 A1* | 8/2005 | Watanabe et al. | 370/347 |
| 2006/0268749 A1* | 11/2006 | Rahman et al. | 370/256 |
| 2008/0240050 A1* | 10/2008 | Pun | 370/338 |
| 2009/0122773 A1* | 5/2009 | Gogic | 370/338 |
| 2010/0008273 A1* | 1/2010 | Stocks | 370/311 |

OTHER PUBLICATIONS

3GPP TSG-RAN WG3 Meeting #55, R3-070090, "Node synchronization aspects in LTE MBMS", Nokia, Vodafone, Siemens, St. Louis, USA, Feb. 12-16, 2007, 2 pgs.

Mock, Michael, et al, "Continuous Clock Synchronization in Wireless Real-Time Applications", IEEE, 2000, 8 pgs.

(Continued)

*Primary Examiner* — John Blanton
(74) *Attorney, Agent, or Firm* — Harrington & Smith

(57) ABSTRACT

The invention is related to wireless communication systems, methods, devices, computer program, and computer-readable memory medium, and, more specifically, relate to synchronization techniques. The invention relates to a method, including deriving two different timings from a timing source, wherein a first derived timing is a physical timing used for timing at least transmissions from a wireless network access node, and wherein a second derived timing is a virtual timing representing a currently preferred physical timing; receiving an indication of a virtual timing from at least one other network access node; comparing the at least one received virtual timing indication with the derived virtual timing of the network access node, and update the derived virtual timing; and determining achieving synchronization of the derived virtual timing with the at least one received virtual timing, and to adjust the physical timing accordingly.

25 Claims, 4 Drawing Sheets

(56) References Cited

OTHER PUBLICATIONS

3GPP TR 36.913 V8.0.1 (Mar. 2009), 3$^{rd}$ Generation Partnership Project; Technical Specification Group Radio Access Network; Requirements for further advancements for Evolved Universal Terrestrial Radio Access (E-UTRA) (LTE-Advanced) (Release 8), 15 pages.

3GPP TS 36.300 V8.8.0 (Mar. 2009), Technical Specification, 3$^{rd}$ Generation Partnership Project; Technical Specification Group Radio Access Network; Evolved Universal Terrestrial Radio Access Network (E-UTRAN); Overall Description; Stage 2 (Release 8), (157 pages).

* cited by examiner

VIRTUAL TIMING INDICATION

CROSS REFERENCE TO RELATED APPLICATIONS

This is a national stage patent application of International Application No. PCT/EP2010/055846 filed Apr. 29, 2010, which claims priority on U.S. provisional patent application No. 61/214,991 filed Apr. 29, 2009.

TECHNICAL FIELD

The exemplary and non-limiting embodiments of this invention relate generally to wireless communication systems, methods, devices and computer programs and, more specifically, relate to synchronization techniques.

BACKGROUND

Various abbreviations that appear in the specification and/or in the drawing figures are defined as follows:
AP access point
BS base station (network access node)
CP cyclic prefix
DRX discontinuous reception
DTX discontinuous transmission
GPS global positioning system
LTE long term evolution (evolved or E-UTRAN, e.g., Rel. 8)
LTE-A LTE advanced
MIMO multiple input/multiple output
O&M operations and maintenance
OTA over-the-air
SFN system frame number
SON self-optimizing network
TDD time division duplex
UMTS universal mobile telecommunications system
UTRAN UMTS terrestrial radio access network In wireless networks it is often the case that all network nodes agree on when a new time period begins, which implies that the beginning and the end of the time period for the nodes needs to be synchronized in some manner.

DETAILED DESCRIPTION

It was noted above that the beginning and the end of a time period for wireless network nodes typically needs to be synchronized. Reasons for this may include, but are not limited to: power conservation, such as when using DTX and/or DRX; interference avoidance/mitigation, such as in a TDD case when, for example, synchronizing co-channel cells and possibly adjacent channel cells; time domain resource sharing, such as OTA silence periods and the duplexing of in-band relays; and when performing collaborative transmission, e.g., macro diversity, C-MIMO.

Periodic time alignment may be referred to herein for convenience as frame synchronicity. Frame synchronicity differs from full time synchronization in that full time synchronicity requires both frame synchronicity and frame number (SFN) synchronicity. Of most interest to the exemplary embodiments of this invention is the case of frame synchronicity.

Figure 1:
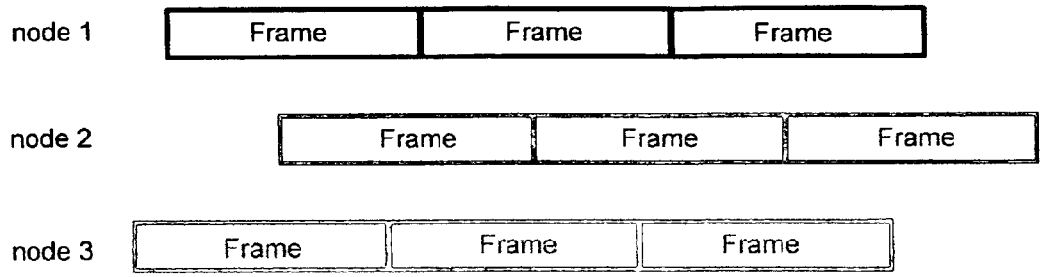
FIG. 1 shows an example of non-synchronized frames.

FIG. 1 shows an example of a problem that may arise. From FIG. 1 it can be seen that three nodes have identical frame durations. The target or goal of frame synchronization is to enable the frames for different nodes to begin at the same instant in time.

In general, time synchronicity may be acquired from clocks running on the internet or from internal servers. However, traffic jitter limits the accuracy of such synchronicity.

At least some certain exemplary embodiments of this invention are concerned with an accuracy of the order of one microsecond (e.g., a fraction of the LTE CP), which cannot be readily achieved by conventional network synchronization algorithms (e.g., see Nokia, Vodafone, Siemens: "Node synchronization aspects in LTE MBMS", R3-070090, 12-16 Feb. 2007, attached hereto as Exhibit A and incorporated by reference herein). In addition, it may be assumed that not all nodes are equipped with a connection to an accurate clock source, e.g., a satellite clock such as one provided by GPS. Accordingly, at least for some nodes, synchronization needs to be based on measurements of timing differences of the node and its neighbor nodes.

Frame synchronicity can be readily accomplished in a network with centralized control, where all nodes simply obey commands received from a central controller through wired or wireless communication links.

Of particular interest herein is distributed frame synchronization where there is no central controlling entity. This particular type of operation may result for a number of different reasons. For example, one reason may be that SON functionality is separated from O&M servers, and established at the BSs or APs. Further by example, another reason may be that the reaction time and signaling capacity of traditional O&M approaches may be insufficient, or too costly, especially in the case of networks with a large number of nodes and dynamic network topologies (e.g., frequent node removal and insertion). Another reason may be that networks belonging to different operators may need to be synchronized (e.g., for adjacent channel networks and/or to accommodate spectrum sharing). Another reason may be that the network is configured as an ad hoc mesh network, e.g. a network operating in, for example, an unlicensed band.

In all of these exemplary and non-limiting cases it may be assumed that the network nodes need to communicate and negotiate with each other locally in order to achieve frame synchronicity.

Based on the foregoing discussion it may be appreciated that a problem to be addressed and solved may be expressed as follows:

Given that a network access node has an algorithm to select a preferred timing that it should use for communications with attached network user nodes, based on current information concerning the state of neighbor network access nodes and their timing, and potentially other information, how does the network access node inform the neighbor network access nodes of the preferred timing? More simply put, what is an optimum timing indication protocol to be used by the network access node?

Figure 2:
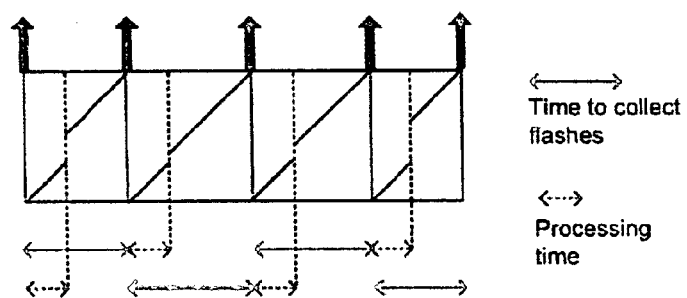
FIG. 2 shows an example of a real (physical) timing indication protocol.

One possible timing indication protocol may be that a network access node signals to one or more neighbor network access nodes information associated with a real, physical timing used at that moment at the network access node. In this manner the neighboring network access nodes measure the timing from a timing signal tied to the frame structure in use (or a UE measures the timing from the signal, and conveys the timing information to the neighbor network access node(s)). A synchronization channel may be considered for this purpose. An example of such a real physical timing indication protocol is depicted in FIG. 2, where a node collects (receives) "flashes", such as synchronization-related or timing-related bursts, from neighboring network access nodes during a collection period, and then processes the collected flashes during a processing interval.

However, this particular timing indication protocol has several drawbacks. For example, when the network access nodes to be synchronized are BSs or APs with UEs attached to them, which represents a problematic case addressed herein, a particular network access node changing its timing should either reboot the cell, or slowly drift towards the desired time (i.e., abrupt timing changes should preferably be avoided). A further drawback is that the duration for collecting and processing the timing information changes for different updating situations, with the risk that there may not be sufficient time for a network access node to collect and process timing information from neighbor nodes.

To overcome these and other drawbacks the exemplary embodiments of this invention use a virtual timing indication protocol wherein, during synchronization, a network access node derives two different times from a timing source, such as a local clock. A first derived time is the physical time, which the network access node uses to time, for example, frames, symbols and samples. The second derived time is referred to herein as a virtual time. The virtual time is considered herein to be a currently preferred frame timing, at that moment, which may or may not be the same as the physical frame timing used at that moment.

Figure 4:
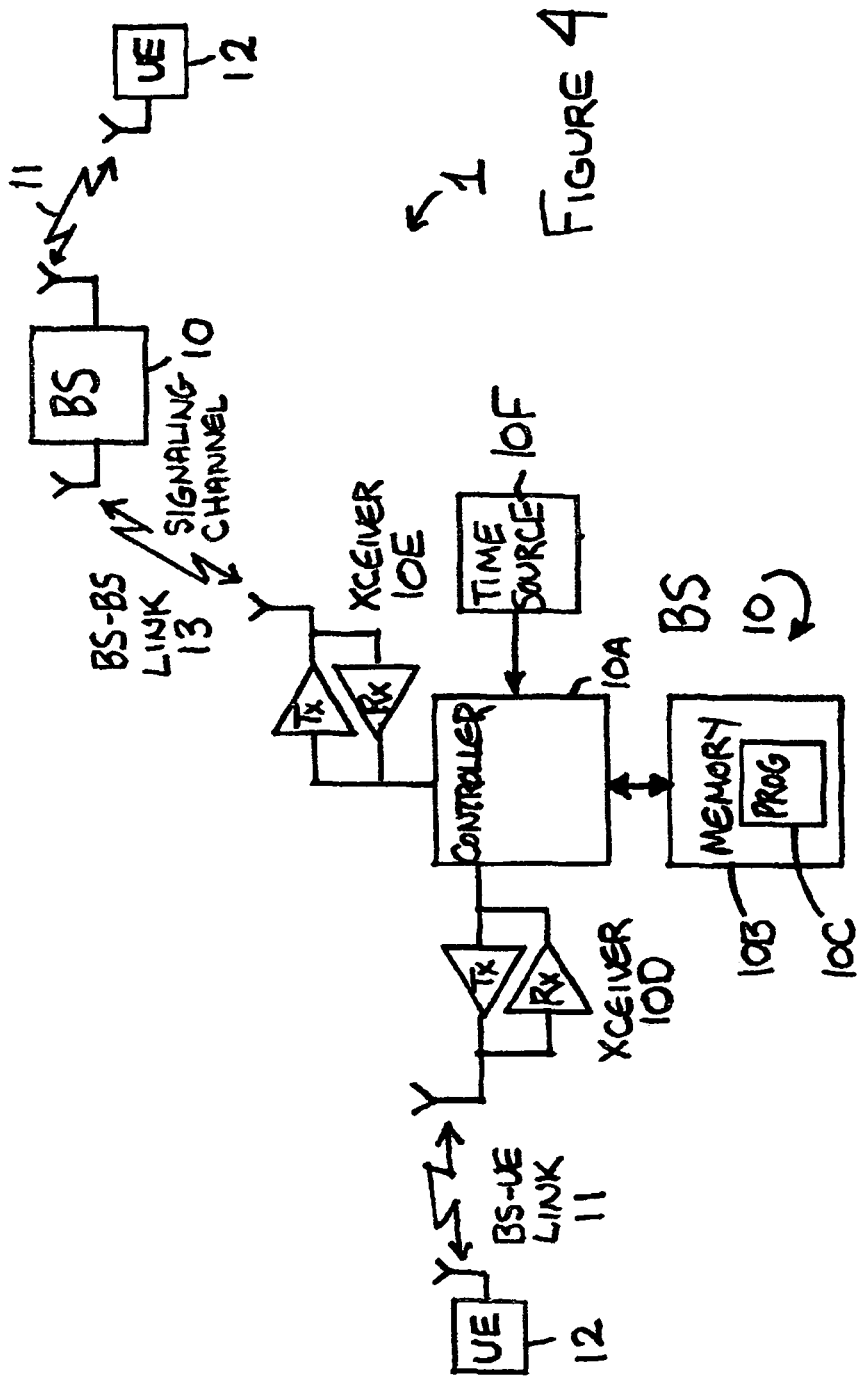
FIG. 4 shows a simplified block diagram of various electronic devices that are suitable for use in practicing the exemplary embodiments of this invention.

Before describing in further detail the exemplary embodiments of this invention, reference is made to FIG. 4 for illustrating a simplified block diagram of various electronic devices and apparatus that are suitable for use in practicing the exemplary embodiments of this invention. In FIG. 4 a wireless network 1 is configured to include a plurality of network access nodes or access points, which may also be referred to as BSs 10 (or in some embodiments as Node Bs, or as evolved Node Bs (eNBs), as non-limiting examples). The BSs 10 are configured to communicate with user devices (mobile or non-mobile), also referred to as UEs 12, via BS-UE wireless links 11. The BSs 10 are also configured to communicate with one another over BS-BS links 13, which may be wireless links as shown or wired links (e.g., a cable or wire providing an inter-BS communication network interface). The BS-BS links 13 may be referred to below as signaling channels. While two BSs 10 are shown in FIG. 4, in practice a given network may have tens or even hundreds of BSs 10. In FIG. 4 the two illustrated BSs 10 may be considered to be neighbor BSs or neighbor nodes.

The BS 10 includes at least one controller 10A, such as a computer or a data processor, at least one computer-readable memory medium embodied as a memory 10B that stores a program of computer instructions (PROG) 10C, and at least one suitable RF transceiver 10D for communication with the UE 12 via one or more antennas. The BS 10 may also include a second RF transceiver 10E for communication with other BSs 10 via one or more antennas (if the inter-BS communication links 13 are implemented in a wireless manner, otherwise another type of suitable inter-BS interface is provided). At the level of detail shown in FIG. 4 all of the BSs 10 may be assumed to be similarly constructed, although they may be provided by different vendors and, in some cases, they may be associated with different network operators.

For the purpose of describing the exemplary embodiments the BS 10 is assumed to include a time source 10F, such as a local clock, or a receiver of GPS time, or any suitable time keeping hardware/software mechanism having a desired accuracy (e.g., on the order of a microsecond or less).

The PROG 10C is assumed to include program instructions that, when executed by the associated controller 10A, enable the BS 10 to operate in accordance with the exemplary embodiments of this invention, as will be discussed below in greater detail. In general, the exemplary embodiments of this invention may be implemented at least in part by computer software executable by the controller 10A, or by hardware, or by a combination of software and hardware (and firmware).

The various embodiments of the UEs 12 can include, but are not limited to, cellular phones, personal digital assistants (PDAs) having wireless communication capabilities, computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory 10B may be of any type suitable to the local technical environment and may be implemented using any suitable data storage technology, such as semiconductor-based memory devices, flash memory, magnetic memory devices and systems, optical memory devices and systems, fixed memory and removable memory. The controller 10A may be of any type suitable to the local technical environment, and may include one or more of general purpose computers, special purpose computers, microprocessors, digital signal processors (DSPs) and processors based on multi-core processor architectures, as non-limiting examples.

Having thus described non-limiting embodiments of hardware/software in which the exemplary embodiments of this invention may be practiced, discussed now in greater detail are the exemplary embodiments of this invention.

There is assumed to be a signaling channel between the BS and one or more neighbor BSs 10, such as the BS-BS link 13, and a signaling protocol is used on this channel. A given network access node (BS 10) signals its preferred timing on this channel to one or more neighbor network access nodes. By thereby exchanging information concerning their preferred timings, as opposed to real (physical) timing indications, the BSs 10 are enabled to rapidly reach a consensus among themselves concerning the timing to be used.

The signaling channel may be implemented, for example, using at least one information element in a broadcast channel, or it may be implemented using a separate frequency channel where, for example, a firefly pulse (i.e., a briefly transmitted pulse) of known structure (the same for all BSs 10) is transmitted. The signaling channel may also be implemented using a dedicated channel from one BS to another.

In practice, the nodes (BSs 10) may acquire information about the real timing used by the neighbor nodes by measurements of signals of the type used in the real timing indication, e.g., synchronization and/or pilot channels. This may be done more or less continuously, or at some specific instants. Knowledge of the real timing used by other network access nodes may be used to determine the preferred (virtual) timing of the network access node. For example, if a particular network access node detects that its frame start time deviates from the frame start time(s) of one or more neighbor network access nodes (BSs 10), then the particular network access would desire to modify its timing (real, physical timing) to more closely match the real, physical timing of the neighbor network access nodes.

When a BS 10 receives virtual timing information from one or more neighbor nodes it stores the information in the memory 10B and compares the received virtual timing indication with its own virtual (frame) timing, instead of with the real physical frame timing, and records the result of the comparison in the memory 10B. During processing the controller 10A uses the virtual timing to calculate a new virtual frame timing and then updates the virtual frame timing.

The preferred (virtual) timing may be indicated as the difference from the current timing, or as the difference to a timing used at an instance t_0 in the past. In the latter case, there may be a signaling protocol between the nodes, based on which the BS 10 knows that the neighbor BS 10 has information of the real timing used at time t_0.

In addition to the virtual preferred timings of the neighbor nodes, and the measurements of timing differences at some time t_0, other information can also be exchanged between the BSs 10. The nodes may self-organize in any suitable manner to a spanning tree, where some nodes begin to obey the virtual timing of a master node.

The signaling on the virtual timing indication channel (e.g., the BS-BS link 13 shown in FIG. 4) may be periodic, for example, related to the physical frame timing used in the network access node at that moment, or some other related period.

Figure 3:
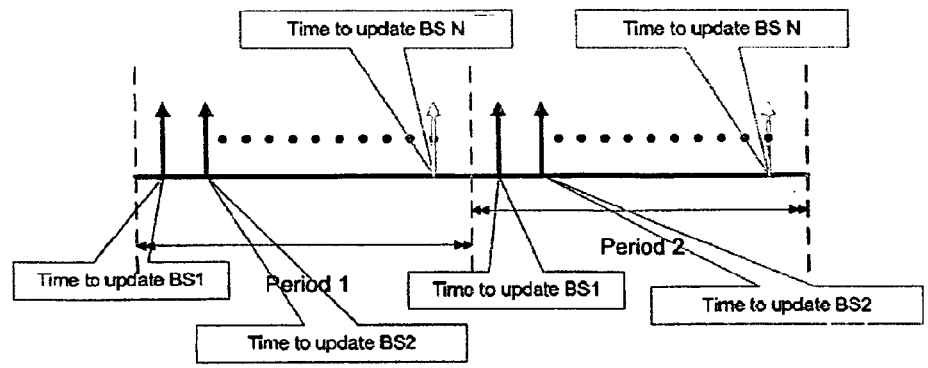
FIG. 3 shows the updating of a node when using a virtual timing indication protocol in accordance with the exemplary embodiments of this invention.

FIG. 3 shows a technique to update the wireless network 1 when using the virtual timing indication protocol. From FIG. 3 it can be seen that there are a plurality of periods (two are shown for convenience), and that the time to update the virtual timing of all the nodes (BSs 1 through N) in every period is fixed. Thus, the time to collect information from neighbor BSs 10s, and the time to process this collected information, for each update round are the same. This makes the overall system more robust. When a BS 10 detects that its virtual timing has been synchronized with its neighbor BS(s) virtual timing, the real physical timing is updated according to the virtual timing at that moment.

The real (physical) timing used in the frame is changed towards the preferred timing using any suitable method. For example, at a suitable time the cell (BS 10) may reboot (i.e., reset) the physical timing to be the preferred timing. As another example, the BS 10 may allow its physical timing to (slowly) drift towards the preferred timing on a continuous basis.

The BS 10 preferably does not change the physical timing when the preferred timing is changing rapidly in reaction to changes in the preferred virtual timing signaled by its neighbor BSs 10. When the virtual timing is stabilizing (small changes from iteration to iteration), or when the preferred timings of the neighbors are all close to one another (within some threshold), the BS 10 may initiate a change of its physical timing towards the preferred timing. The change of the physical timing may thus occur only after a certain period of stability and/or is subject to a certain accuracy requirement (e.g., no adaptation is required within a certain accuracy interval). Both parameters may be fixed in the network 1, or they may be changed by a superordinate node.

The virtual timing indication protocol is used to transmit the timing information and may be used, in one non-limiting example, to synchronize a self-organized network having a random topology.

As a result of the use of these exemplary embodiments the real physical timing of each BS 10 does not need to fluctuate before synchronicity is achieved. For example, when a new node joins the system the new node preferably obeys the timing from its synchronized neighbor node(s) according to the timing updating algorithm. Then, the neighbor node(s) update their virtual timing and continue to use the synchronized real physical timing. When the virtual timing is synchronized again, the new network access node has the same virtual timing and changes its real physical timing accordingly. Consequently, it is possible to avoid severe and undesirable fluctuations in the timings of the system.

The signaling channel, the BS-BS link 13 shown in FIG. 4, may be embodied (in E-UTRAN or in LTE-A) as the X2 interface (see FIG. 5), or as other LTE (LTE-A) interfaces, such as S1, via intermediate network node(s), or by a broadcast control channel. In another exemplary embodiment the signaling channel may be conveyed via one of the UEs 12 from BS-to-BS. In this latter case the additional transceiver 10E shown in FIG. 4 may not be needed.

Figure 5:
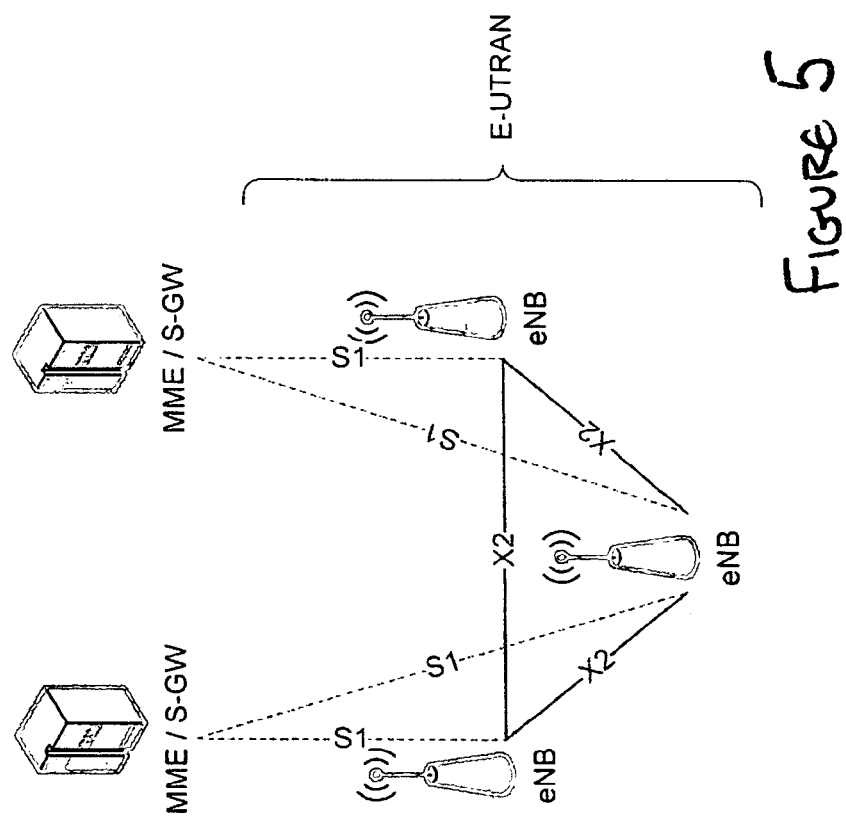
FIG. 5 reproduces FIG. 4.1 of 3GPP TS 36.300, and shows the overall architecture of the E-UTRAN system, in particular the various interfaces between the network access node (eNBs in this case).

FIG. 5 reproduces FIG. 4.1 of 3GPP TS 36.300, V8.8.0 (2009-03), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8), incorporated by reference herein in its entirety, and shows the overall architecture of the E-UTRAN system. The E-UTRAN system includes eNBs, providing the E-UTRA user plane and control plane protocol terminations towards the UE. The eNBs are interconnected with each other by means of the X2 interface. The eNBs are also connected by means of the S1 interface to an evolved packet core (EPC), more specifically to a MME (Mobility Management Entity) and to a Serving Gateway (S-GW). The S1 interface supports a many-to-many relationship between MMES/Serving Gateways and eNBs.

General reference with regard to LTE-A may be made to 3GPP TR 36.913 V8.0.1 (2009-03) Technical Report 3rd Generation Partnership Project; Technical Specification Group Radio Access Network; Requirements for further advancements for Evolved Universal Terrestrial Radio Access (E-UTRA) (LTE-Advanced) (Release 8), which is also incorporated by reference herein.

One exemplary technical effect that is achieved by the use of the exemplary embodiments of this invention is that the virtual timing indication protocol guarantees a faster convergence towards synchronicity, without excessively changing the physical timing. Furthermore, the use of the virtual timing indication protocol enables the network 1 to continue in operation as new access nodes join the network, thereby making the network more robust.

Based on the foregoing it should be apparent that the exemplary embodiments of this invention provide a method, apparatus and a computer program to provide transmission time synchronization in a wireless network amongst a plurality of wireless network access nodes.

Figure 6:
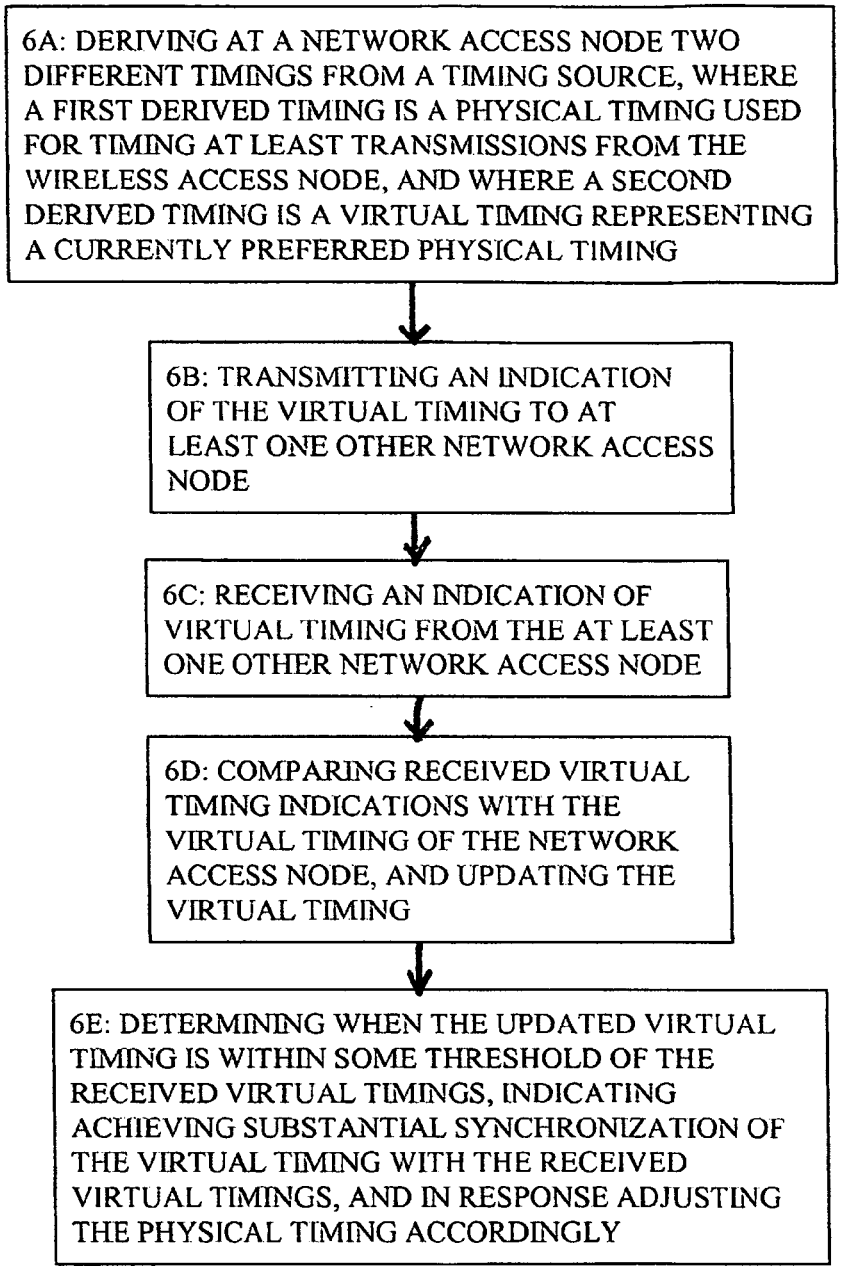
FIG. 6 is a logic flow diagram that illustrates the operation of a method, and a result of execution of computer program instructions, in accordance with the exemplary embodiments of this invention.

FIG. 6 is a logic flow diagram that illustrates the operation of a method, and a result of execution of computer program instructions, in accordance with the exemplary embodiments of this invention.

(A) At Block 6A there is a step of deriving at a network access node two different timings from a timing source, where a first derived timing is a physical timing used for timing at least transmissions from the wireless access node, and where a second derived timing is a virtual timing representing a currently preferred physical timing. At Block 6B there is a step of transmitting an indication of the virtual timing to at least one other network access node. At Block 6C there is a step of receiving an indication of virtual timing from the at least one other network access node. At Block 6D there is a step of comparing received virtual timing indications with the virtual timing of the network access node, and updating the virtual timing. At Block 6E there is a step of determining when the updated virtual timing is within some threshold of the received virtual timings, indicating achieving substantial synchronization of the virtual timing with the received virtual timings, and in response adjusting the physical timing accordingly.

(B) In the method and computer program of the preceding paragraph, where the virtual timing is indicated as a difference from the current physical timing.

(C) In the method and computer program of paragraph (A), where the virtual timing is indicated as a difference from a timing used at an instance t_0 in the past.

(D) In the method and computer program of the preceding paragraphs, where the steps of Blocks 6A-6E are performed during timing periods.

(E) In the method and computer program of the preceding paragraphs, where the timing periods repeat one after the other, and have the same duration.

(F) In the method and computer program of the preceding paragraphs, where the steps of transmitting and receiving occur through a wireless signaling channel between network access nodes, through a wireless signaling channel between network access nodes via an intermediate wireless node, through a wired signaling channel between network access nodes, or through a wired signaling channel between network access nodes via an intermediate network node.

(G) In the method and computer program of the preceding paragraphs, where the step of adjusting the physical timing comprises resetting the physical timing to be the same as the preferred timing, or allowing the physical timing to drift towards the preferred timing.

(H) In the method and computer program of the preceding paragraphs, where the physical timing defines at least a frame start time between the network access node and a wireless node.

The various blocks shown in FIG. 6 may be viewed as method steps, and/or as operations that result from operation of computer program code, and/or as a plurality of coupled logic circuit elements constructed to carry out the associated function(s). Further, certain of the operations/steps could be performed in a different order than shown (e.g., the steps of Blocks 6B and 6C may be interchanged), and additional steps/operations may be added.

The exemplary embodiments of this invention also pertain in part to an apparatus, embodied at a wireless network access node, that comprises a controller, a memory, a wireless transceiver, an interface to at least one other wireless network access node, and a timing source. The controller is configured to of derive two different timings from the timing source, where a first derived timing is a physical timing used for timing at least transmissions from the wireless network access node, and where a second derived timing is a virtual timing representing a currently preferred physical timing. The controller is further configured to transmit, via the interface, an indication of the virtual timing to at least one other network access node via said interface and to receive, via the interface, an indication of virtual timing from the at least one other network access node. The controller is further configured to compare received virtual timing indications with the virtual timing of the network access node, and to update the virtual timing. in accordance therewith. The controller is further configured to determine when the updated virtual timing is within some threshold of the received virtual timings, indicating achieving substantial synchronization of the virtual timing with the received virtual timings, and in response to adjust the physical timing accordingly.

In the apparatus as in the preceding paragraph, where the virtual timing is indicated as a difference from the current physical timing, or where the virtual timing is indicated as a difference from a timing used at an instance t_0 in the past.

In the apparatus as in the preceding paragraphs, where the operations of the controller are executed during timing periods, and where the timing periods repeat one after the other and have the same duration.

In the apparatus as in the preceding paragraphs, where the interface comprises at least one of a wireless signaling channel between network access nodes, a wireless signaling channel between network access nodes via an intermediate wireless node, a wired signaling channel between network access nodes, and a wired signaling channel between network access nodes via an intermediate network node.

In the apparatus as in the preceding paragraphs, where adjusting the physical timing comprises resetting the physical timing to be the same as the preferred timing, or allowing the physical timing to drift towards the preferred timing, and where the physical timing defines at least a frame start time between the network access node and a wireless node.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules, and that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above partially in the context of the LTE and LTE-A systems, it should be appreciated that the exemplary embodiments of this invention are not limited for use with only these particular types of wireless communication systems. These exemplary embodiments may be used to advantage in other wireless communication systems, including sensor networks, ad hoc networks, self-configuring, self-optimizing and/or self-aware networks, and in networks based on software-defined radio implementations, as non-limiting examples.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A controller,
the controller being embodied in an apparatus that comprises a wireless network access node that is coupled to at least one other wireless network access node, the controller being configured to implement modules configured to derive two different timings from a timing source, wherein a first derived timing is a physical timing used for timing at least transmissions of frames from the wireless network access node, and wherein a second derived timing is a virtual timing representing a currently preferred physical frame timing, where the virtual timing representing the currently preferred physical frame may or may not be equal to a current physical timing;
configured to receive an indication of a virtual timing from the at least one other wireless network access node;
configured to compare the at least one received virtual timing indication with the derived virtual timing of the wireless network access node, and update the derived virtual timing; and
configured to determine achieving synchronization of the derived virtual timing with the at least one received virtual timing, and to adjust the physical timing accordingly.

2. The controller of claim 1, wherein the virtual timing is indicated as a difference from the current physical timing, or the virtual timing is indicated as a difference from a timing used at an instance t_0 in the past.

3. The controller of claim 1, further configured to execute operations of the controller during timing periods, and to repeat the timing periods one after the other, the timing periods having a same duration.

4. The controller of claim 1, wherein the adjusting of the physical timing comprises:
resetting the physical timing to be the same as the currently preferred physical frame timing, or allowing the physical timing to drift towards the currently preferred physical frame timing, wherein the physical timing defines at least a frame start time between the wireless network access node and a wireless node.

5. The controller of claim 1, further configured to initiate the adjusting of the physical timing when the virtual timing change is stabilizing, or when preferred physical timings of neighbors are all close to one another.

6. The controller of claim 1, the apparatus further comprising a memory, and at least one radio frequency transceiver.

7. The apparatus of claim 1, where the indication of the virtual timing from the at least one other wireless network access node is received from one of an X2 interface, an S1 interface, an intermediate wireless network node or nodes, a broadcast control channel, or via a user equipment.

8. A computer program stored on a non-transitory computer readable memory medium, the computer program comprising program instructions which, when loaded into the controller, constitute the modules of claim 1.

9. A method, comprising:
operating a controller that comprises part of a wireless network access node that is coupled to at least one other wireless network access node, where operating comprises deriving two different timings from a timing source, wherein a first derived timing is a physical timing used for timing at least transmissions of frame from the wireless network access node, and wherein a second derived timing is a virtual timing representing a currently preferred physical frame timing, where the virtual timing representing the currently preferred physical frame timing may or may not be equal to a current physical timing;
receiving an indication of a virtual timing from the at least one other wireless network access node;
comparing the at least one received virtual timing indication with the derived virtual timing of the wireless network access node, and update the derived virtual timing; and
determining achieving synchronization of the derived virtual timing with the at least one received virtual timing, and to adjust the physical timing accordingly.

10. The method of claim 9, wherein the virtual timing is indicated as a difference from the current physical timing, or the virtual timing is indicated as a difference from a timing used at an instance t_0 in the past.

11. The method of claim 9, further comprising:
executing operations of the controller during timing periods, and to repeat the timing periods one after the other, the timing periods having a same duration.

12. The method of claim 9, wherein the adjusting of the physical timing comprises:
resetting the physical timing to be the same as the currently preferred physical frame timing, or allowing the physical timing to drift towards the currently preferred physical frame timing, wherein the physical timing defines at least a frame start time between the network access node and a wireless node.

13. The method of claim 9, further comprising:
initiating the adjusting of the physical timing when the virtual timing change is stabilizing, or when preferred physical timings of neighbors are all close to one another.

14. A system, comprising a plurality of wireless network access nodes, each wireless network access node comprising a controller, a memory and at least one radio frequency transceiver, the controller being configured to:
derive two different timings from a timing source, wherein a first derived timing is a physical timing used for timing at least transmissions of frames from the wireless network access node, and wherein a second derived timing is a virtual timing representing a currently preferred physical frame timing, where the virtual timing representing the currently preferred physical frame timing may or may not be equal to a current physical timing;

receive an indication of a virtual timing from at least one other wireless network access node;

compare the at least one received virtual timing indication with the derived virtual timing of the wireless network access node, and update the derived virtual timing; and determine achieving synchronization of the derived virtual timing with the at least one received virtual timing, and to adjust the physical timing accordingly.

15. The system of claim 14, wherein the wireless network access nodes are further configured to self-organize themselves to a spanning tree, wherein some of the wireless network access nodes are configured to obey the virtual timing of a master node.

16. The system of claim 14, wherein the wireless network access nodes are further configured to transmit an indication of their derived virtual timings to at least one other of the wireless network access nodes.

17. The system of claim 14, wherein the virtual timing is indicated as a difference from the current physical timing, or the virtual timing is indicated as a difference from a timing used at an instance $t\_0$ in the past.

18. The system of claim 14, wherein the wireless network access nodes are further configured to execute operations of the controller during timing periods, and to repeat the timing periods one after the other, the timing periods having a same duration.

19. The system of claim 14, wherein the adjusting of the physical timing comprises:

resetting the physical timing to be the same as the currently preferred physical frame timing, or allowing the physical timing to drift towards the currently preferred physical frame timing, wherein the physical timing defines at least a frame start time between the wireless network access node and a wireless node.

20. The system of claim 14, wherein the wireless network access nodes are further configured to initiate the adjusting of the physical timing when the virtual timing change is stabilizing, or when preferred physical timings of neighbors are all close to one another.

21. A non-transitory computer-readable memory medium storing a program of computer instructions for executing by a controller that comprises part of a wireless network access node:

deriving two different timings from a timing source, wherein a first derived timing is a physical timing used for timing at least transmissions of frame from the wireless network access node, and wherein a second derived timing is a virtual timing representing a currently preferred physical frame timing, where the virtual timing, representing the currently preferred physical frame timing may or may not be equal to a current physical timing;

receiving an indication of a virtual timing from the at least one other wireless network access node;

comparing the at least one received virtual timing indication with the derived virtual timing of the wireless network access node, and update the derived virtual timing; and determining achieving synchronization of the derived virtual timing with the at least one received virtual timing, and to adjust the physical timing accordingly.

22. The non-transitory computer-readable memory medium of claim 21, wherein the virtual timing is indicated as a difference from the current physical timing, or the virtual timing is indicated as a difference from a timing used at an instance $t\_0$ in the past.

23. The non-transitory computer-readable memory medium of claim 21, further comprising:

executing operations of the controller during timing periods, and to repeat the timing periods one after the other, the timing periods having a same duration.

24. The non-transitory computer-readable memory medium of claim 21, wherein the adjusting of the physical timing comprises:

resetting the physical timing to be the same as the currently preferred physical frame timing, or allowing the physical timing to drift towards the currently preferred physical frame timing, wherein the physical timing defines at least a frame start time between the network access node and a wireless node.

25. The non-transitory computer-readable memory medium of claim 21, further comprising:

initiating the adjusting of the physical timing when the virtual timing change is stabilizing, or when preferred physical timings of neighbors are all close to one another.

* * * * *

UNITED STATES PATENT AND TRADEMARK OFFICE
CERTIFICATE OF CORRECTION

PATENT NO. : 8,798,032 B2  Page 1 of 1
APPLICATION NO. : 13/266953
DATED : August 5, 2014
INVENTOR(S) : Tirkkonen et al.

It is certified that error appears in the above-identified patent and that said Letters Patent is hereby corrected as shown below:

In the Claims

Claim 1, col. 9, line 43 --timing-- should be inserted in between "frame" and "may".

Signed and Sealed this
Fourth Day of November, 2014

Michelle K. Lee
*Deputy Director of the United States Patent and Trademark Office*